(12) United States Patent
Shen et al.

(10) Patent No.: US 10,679,034 B2
(45) Date of Patent: Jun. 9, 2020

(54) SHORT LATENCY FINGERPRINT SENSING

(71) Applicant: Synaptics Incorporated, San Jose, CA (US)

(72) Inventors: Guozhong Shen, San Jose, CA (US); Yongqian Tang, San Jose, CA (US); Ozan Erdogan, San Jose, CA (US)

(73) Assignee: Synaptics Incorporated, San Jose, CA (US)

( * ) Notice: Subject to any disclaimer, the term of this patent is extended or adjusted under 35 U.S.C. 154(b) by 0 days.

(21) Appl. No.: 16/271,551

(22) Filed: Feb. 8, 2019

(65) Prior Publication Data

US 2019/0377924 A1 Dec. 12, 2019

Related U.S. Application Data

(60) Provisional application No. 62/682,670, filed on Jun. 8, 2018.

(51) Int. Cl.
*G06K 9/00* (2006.01)
*G09G 3/20* (2006.01)

(52) U.S. Cl.
CPC ............ *G06K 9/0004* (2013.01); *G09G 3/20* (2013.01); *G09G 2310/0286* (2013.01); *G09G 2310/063* (2013.01); *G09G 2360/14* (2013.01)

(58) Field of Classification Search
CPC .. G06K 9/0004; G06K 9/209; G06K 9/00013; G09G 3/20; G09G 2360/14; G09G 2310/0286; G09G 2310/063
See application file for complete search history.

(56) References Cited

U.S. PATENT DOCUMENTS

| | | | | |
|---|---|---|---|---|
| 2009/0252384 | A1* | 10/2009 | Dean | G06K 9/0002 382/124 |
| 2015/0310248 | A1* | 10/2015 | Riedijk | G06K 9/0008 382/124 |
| 2017/0006245 | A1* | 1/2017 | Akhavan Fomani | G06K 9/0002 |
| 2017/0083738 | A1* | 3/2017 | Park | G06K 9/0004 |
| 2017/0123556 | A1* | 5/2017 | Lin | G06F 3/0412 |
| 2018/0357464 | A1* | 12/2018 | Wang | G06K 9/0004 |
| 2019/0012518 | A1* | 1/2019 | Yang | G06K 9/00087 |
| 2019/0318147 | A1* | 10/2019 | Shen | H03K 5/15093 |

* cited by examiner

*Primary Examiner* — Abhishek Sarma
(74) *Attorney, Agent, or Firm* — Ferguson Braswell Fraser Kubasta PC (57) ABSTRACT

An input device includes sensing pixels, each sensing pixel including a photodiode, and a gate driver circuit controlling operation of the sensing pixels. The gate driver circuit includes a set of cascaded gate driver units. Each of the cascaded gate driver units is associated with a subset of the sensing pixels, controlling an operation of the subset of the sensing pixels. The set of cascaded gate driver units output, during a reset phase of the input device, a global reset gate control signal to the sensing pixels in response to a clock signal. Each of the cascaded gate driver units sequentially output, during an operating phase of the input device, an operating gate control signal to the associated subset of the sensing pixels.

20 Claims, 7 Drawing Sheets

SHORT LATENCY FINGERPRINT SENSING

CROSS REFERENCE TO RELATED APPLICATIONS

The present application claims priority under 35 U.S.C. § 119(e) to U.S. Provisional Application No. 62/682,670, filed on Jun. 8, 2018, having at least one of the same inventors as the present application, and entitled, "SHORT LATENCY FINGERPRINT SENSING".

FIELD

This specification generally relates to electronic devices and specifically to fingerprint sensors.

BACKGROUND

Fingerprint sensors are used in a variety of electronic systems. A fingerprint sensor typically includes a sensing region, often demarked by a surface, in which the fingerprint sensor captures biometric data of one or more input objects, such as fingers. Biometric devices may be used to provide interfaces for the electronic system. For example, biometric recognition (or "biometric matching") may be used to enhance security or usability by recognizing discriminatory biometric characteristics of users for purposes of authentication or identification. A thin film transistor (TFT) fingerprint sensor may be used for the fingerprint sensing.

SUMMARY

In general, in one aspect, one or more embodiments relate to an input device. The input device comprises a plurality of sensing pixels, each sensing pixel comprising a photodiode; and a gate driver circuit configured to: control operation of the plurality of sensing pixels, the gate driver circuit comprising a set of cascaded gate driver units; wherein each of the cascaded gate driver units is associated with a subset of the plurality of sensing pixels and configured to control an operation of the subset of the plurality of sensing pixels and configured to control an operation of the subset of the plurality of sensing pixels; output, by the set of cascaded gate driver units, during a reset phase of the input device, a global reset gate control signal to the plurality of sensing pixels in response to a clock signal; output, sequentially by each of the cascaded gate driver units, during an operating phase of the input device, an operating gate control signal to the associated subset of the plurality of sensing pixels.

In general, in one aspect, one or more embodiments relate to a method for operating an input device, the method comprising: during a reset phase of the input device: providing a first clock signal to a gate driver circuit of the input device; outputting, by a plurality of cascaded gate driver units of the gate driver circuit, in response to the first clock signal, a global reset gate control signal to a plurality of sensing pixels of the input device, to reset the plurality of sensing pixels, wherein each of the plurality of sensing pixels comprises a photodiode, and wherein each of the cascaded gate driver units is associated with a subset of the plurality of sensing pixels, controlling the operation of the subset of the sensing pixels; and during an operating phase of the input device, following the reset phase: providing a second clock signal to the gate driver circuit of the input device; outputting, sequentially by each of the plurality of cascaded gate driver units, in response to the second clock signal, an operating gate control signal to the associated subsets of the plurality of sensing pixels to obtain an image frame comprising a fingerprint image using the plurality of pixels; and comparing the obtained image frame to archived image frames stored in a fingerprint data repository to determine whether the fingerprint image is recognized.

Other aspects of the disclosure will be apparent from the following description and the appended claims.

BRIEF DESCRIPTION OF DRAWINGS

One or more embodiments of the disclosure will hereinafter be described in conjunction with the appended drawings, where like designations denote like elements.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

In the following detailed description of embodiments of the disclosure, numerous specific details are set forth to provide a more thorough understanding of the disclosed embodiments. However, it will be apparent to one of ordinary skill in the art that the disclosed embodiments may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Figure 1:
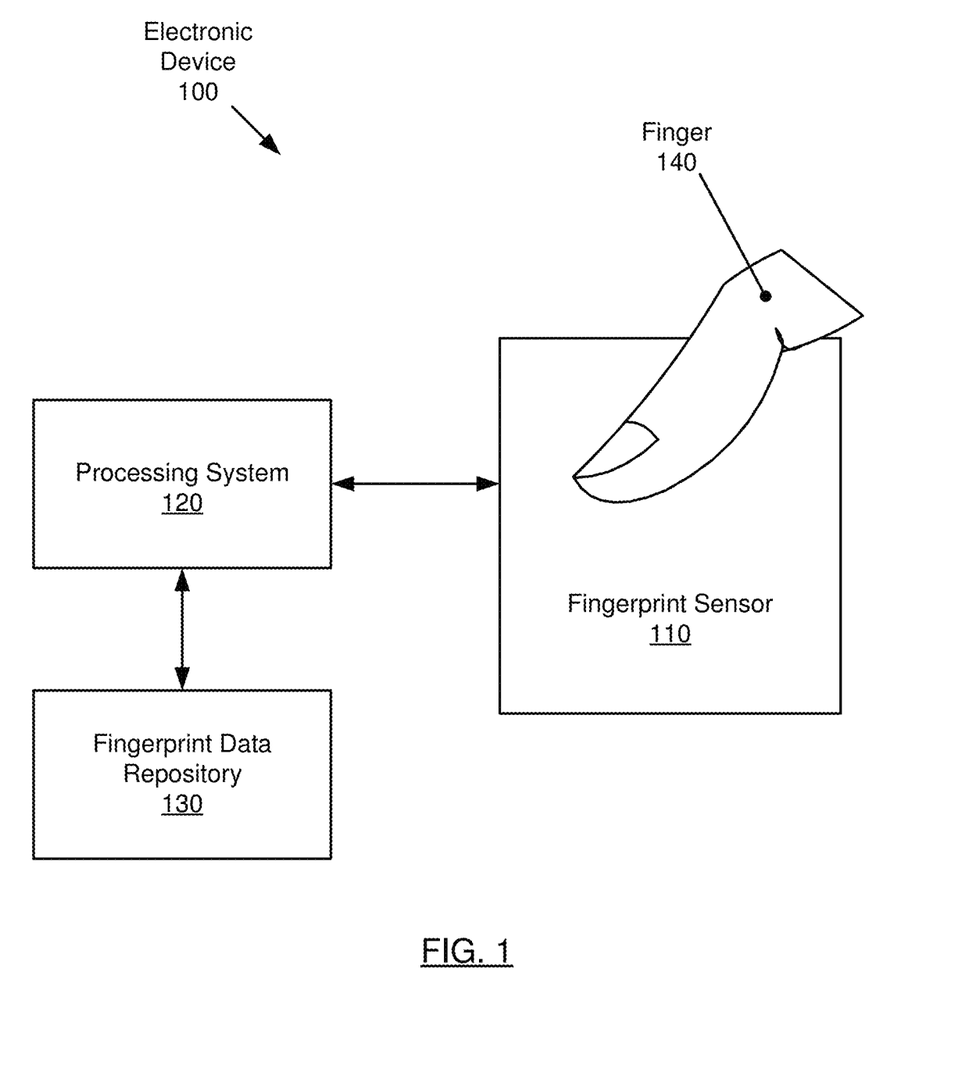
FIG. 1 shows a block diagram of an electronic device, in accordance with one or more embodiments.

Turning now to the figures, FIG. 1 shows an electronic device (100) in accordance with one or more embodiments of the disclosure. As shown in FIG. 1, the electronic device (100) includes a fingerprint sensor (110), a processing system (120), and a fingerprint data repository (130). Each of these components is described below.

In one or more embodiments of the disclosure, the fingerprint sensor (110) is any sensor capable of detecting the presence of a fingerprint in a fingerprint sensing region (not shown). As used herein, fingerprint means a pattern formed by ridges on the surface of the skin of a finger or thumb. In one or more embodiments of the disclosure, the fingerprint sensor (110) may be any combination of hardware (e.g., circuitry), software, firmware, or a combination thereof.

A fingerprint sensor (110) may detect the presence of a fingerprint using any method. Examples of such a method include, but are not limited to, optical fingerprint sensing, capacitive fingerprint sensing, and ultrasonic fingerprint sensing. An optical fingerprint sensor may capture an image of a fingerprint using light. A capacitive fingerprint sensor may include any number of electrodes (hereinafter sensing pixels) and may use either mutual or absolute capacitance to form a capacitive image of a fingerprint. An ultrasonic fingerprint sensor may use high-frequency waves to create an ultrasonic image of a layer underneath the surface skin of a finger that includes the same or similar pattern as the fingerprint. In one or more embodiments disclosed herein, one or more of the aforementioned types of fingerprint sensors may be implemented together in a single fingerprint sensor and/or multiple fingerprint sensors of the same or different type may be integrated in the same electronic device.

One or more embodiments provide input devices and methods that facilitate improved usability. In particular, one or more embodiments of the disclosure provide a user of a device with the ability to rapidly acquire a fingerprint. More specifically, one or more embodiments disclosed herein include functionality to obtain a fingerprint readout from one of the first frames acquired from a thin film transistor (TFT) fingerprint sensor immediately or very shortly after a wakeup of the TFT fingerprint sensor.

A fingerprint sensor (110) may detect a fingerprint of a finger that a user places over the sensor, and/or may detect a fingerprint of a finger that is swiped over the sensor. The finger for which a fingerprint is being detected may or may not come into actual contact with the fingerprint sensor (i.e., the fingerprint may be proximate to the sensor without actually touching the sensor). In one or more embodiments of the disclosure, a fingerprint sensor (110) is located anywhere on the exterior of a device. As an example of such an embodiment, the fingerprint sensor (110) may be an array of sensing pixels of any size and/or quantity that is located on a portion of a smart phone (i.e., an electronic device (100)), such as a display screen, a home button, the rear of the smartphone, and/or the sides of the smart phone.

In one or more embodiments of the disclosure, the fingerprint sensor (110) is operatively connected to a processing system (120). The processing system (120) is configured to operate the hardware of the electronic device (100) to detect fingerprints using the fingerprint sensor (110). The processing system (120) includes parts of, or all of, one or more integrated circuits (ICs) and/or other circuitry components. In some embodiments, the processing system (120) also includes electronically-readable instructions, such as firmware code, software code, a computer program product, and/or the like.

In some embodiments, components composing the processing system (120) are located together, such as near sensing element(s) of the electronic device (100). In other embodiments, components of processing system (120) are physically separate with one or more components close to the sensing element(s) of the electronic device (100), and one or more components elsewhere. For example, the electronic device (100) may be a peripheral coupled to a computing device, and the processing system (120) may include software configured to run on a central processing unit of the computing device and one or more ICs (perhaps with associated firmware) separate from the central processing unit. As another example, the input device (100) may be physically integrated in a mobile device, and the processing system (120) may include circuits and firmware that are part of a main processor of the mobile device. In some embodiments, the processing system (120) is dedicated to implementing the electronic device (100). In other embodiments, the processing system (120) also performs other functions, such as operating display screens, driving haptic actuators, receiving and processing measurements related to the fingerprint sensor (110), etc.

The processing system (120) may be implemented as a set of modules that handle different functions of the processing system (120). Each module may include circuitry that is a part of the processing system (120), firmware, software, and/or a combination thereof. In some embodiments, modules may be standalone modules, or may be implemented as various combinations of modules. Any one or more modules may be linked to any one or more other modules, with such links allowing the modules to function together to form a system. As a non-limiting example, a module or set of modules (e.g., processing system (120)), as used herein, may include software written in any programming language, which may be stored on volatile and/or non-volatile memory. Such software, when executed, may lead, directly (e.g., via compilation) or indirectly (e.g., via interpretation), to the generation of machine code (e.g., binary numbers such as 11010101) used as input to at least a portion of the integrated circuitry of one or more processors. Input of machine code to the processor(s) may cause various effects within the circuitry of the processor(s), with such effects implementing at least a portion of the programming language source code from which the machine code was derived. Examples of such effects include, but are not limited to: biasing a transistor to allow current flow or not; creating connections between various portions of the circuitry; causing current to flow through various portions of circuitry; causing the voltage across a circuit element to change; etc. Said another way, as used herein, a module configured to perform certain functionality should be understood to include software and/or firmware, as well as at least a portion of the underlying computing hardware on which the software executes.

The processing system (120) may include functionality to drive sensing elements (e.g., photodiodes providing sensing pixels) of the fingerprint sensor and receive the resulting signals, as further described below. For example, the processing system (120) may include sensory circuitry that is coupled to the sensing elements.

In one or more embodiments of the disclosure, the processing system (120) includes functionality to receive information from the fingerprint sensor (110) and process the information to determine whether or not a finger (e.g., finger (140)), and corresponding fingerprint, is interacting with (e.g., in contact with or proximate to) the fingerprint sensor. In one or more embodiments disclosed herein, if a finger (140) is determined to be interacting with the fingerprint sensor, the processing system (120) includes functionality to process data corresponding to the fingerprint of the finger and to store fingerprint data in a fingerprint data repository (130) and/or detect that the fingerprint is an enrolled fingerprint based on a comparison with fingerprint data already in a fingerprint data repository (130).

In one or more embodiments of the disclosure, the processing system (120) is operatively connected to the aforementioned fingerprint data repository (130). In one or more embodiments disclosed herein, the fingerprint data repository (130) is any type of storage unit and/or device (e.g., a file system, database, collection of tables, or any other storage mechanism) for storing data. Further, the fingerprint data repository (130) may include multiple different storage units and/or devices. The multiple different storage units and/or devices may or may not be of the same type or located at the same physical site.

In one or more embodiments of the disclosure, the fingerprint data repository (130) includes functionality to store fingerprint data corresponding to any number of individual fingerprints from any number of users of an electronic device (100) with a fingerprint sensor (110). In one or more embodiments disclosed herein, the fingerprint data stored in the fingerprint data repository (130) corresponds to any number of fingerprints enrolled via an enrollment process. In one or more embodiments disclosed herein, an enrollment process is any process by which a user of an electronic device (100) including or otherwise coupled to a fingerprint sensor (110) provides fingerprint data, via the fingerprint sensor, to the electronic device to be stored for use in future fingerprint verification or authentication. Fingerprint verification may be performed for any reason. Examples of such reasons include, but are not limited to, unlocking an electronic device, causing a display screen of an electronic device to transition from a sleep state (e.g., the screen is off) to an active state (e.g., the screen is on), causing an electronic device to transition from a low power mode to a higher power mode, etc.

In one or more embodiments of the disclosure, the processing system (120) is also operatively connected to an operating system (not shown) (e.g., the operating system executes using the processing system). In one or more embodiments disclosed herein, an operating system includes any software and/or firmware for managing the resources (e.g., hardware, other software, etc.) of one or more electronic devices (100). More specifically, the operating system may be a program or set of programs that manages all or a portion of the other software (e.g., applications) in an electronic device (100).

The embodiments disclosed herein apply equally regardless of the particular type of medium used to carry out the distribution. For example, software instructions in the form of computer readable program code to perform embodiments disclosed herein may be stored, in whole or in part, temporarily or permanently, on a non-transitory computer-readable storage medium. Examples of non-transitory, electronically-readable media include various discs, physical memory, memory, memory sticks, memory cards, memory modules, and or any other computer readable storage medium. Electronically-readable media may be based on flash, optical, magnetic, holographic, or any other storage technology.

Although not shown in FIG. 1, the processing system, the electronic device, and/or the host system may include one or more computer processor(s), associated memory (e.g., random access memory (RAM), cache memory, flash memory, etc.), one or more storage device(s) (e.g., a hard disk, an optical drive such as a compact disk (CD) drive or digital versatile disk (DVD) drive, a flash memory stick, etc.), and numerous other elements and functionalities. The computer processor(s) may be an integrated circuit for processing instructions. For example, the computer processor(s) may be one or more cores or micro-cores of a processor. Further, one or more elements of one or more embodiments may be located at a remote location and connected to the other elements over a network. Further, embodiments of the disclosure may be implemented on a distributed system having several nodes, where each portion may be located on a different node within the distributed system. In one embodiment of the disclosure, the node corresponds to a distinct computing device. Alternatively, the node may correspond to a computer processor with associated physical memory. The node may alternatively correspond to a computer processor or micro-core of a computer processor with shared memory and/or resources.

While FIG. 1 shows a configuration of components, other configurations may be used without departing from the scope of embodiments disclosed herein. For example, various components may be combined to create a single component. As another example, the functionality performed by a single component may be performed by two or more components. Accordingly, embodiments should not be limited to the configuration of components shown in FIG. 1.

Figure 2:
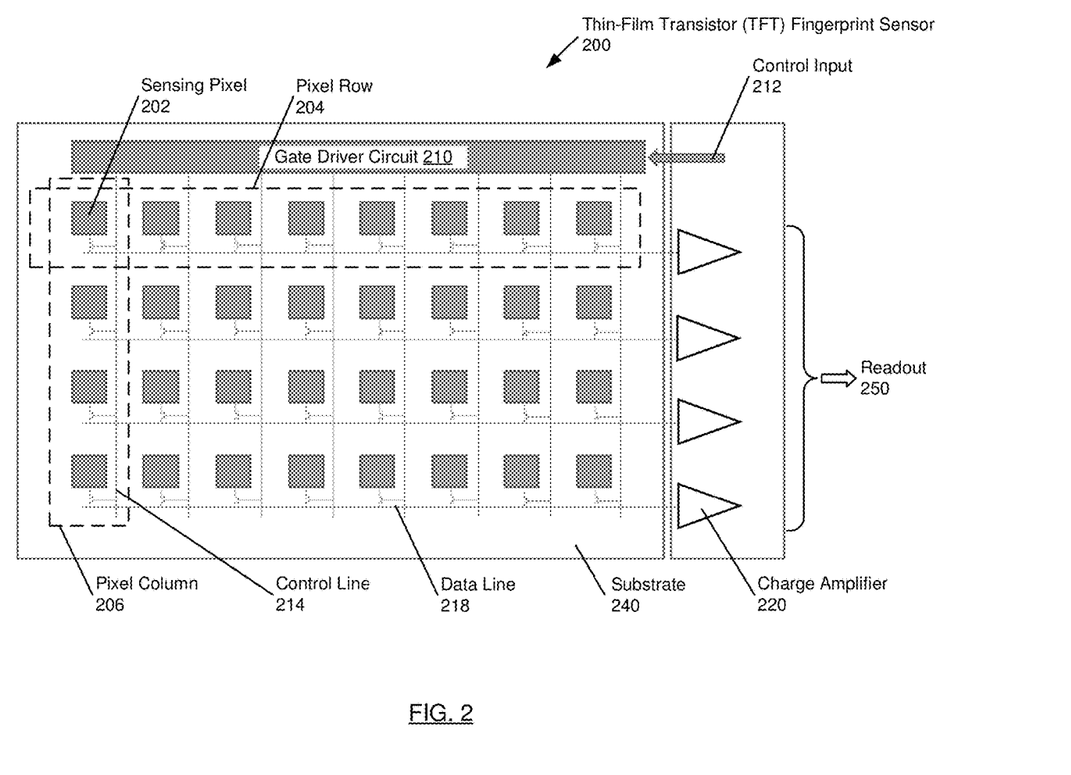
FIG. 2 shows a thin-film transistor fingerprint sensor, in accordance with one or more embodiments.

Turning to FIG. 2, a thin-film transistor (TFT) fingerprint sensor (200), in accordance with one or more embodiments, is shown. The TFT fingerprint sensor (200) may include sensing pixels (202) arranged in pixel rows (204) and pixel columns (206), a gate driver circuit (210), control lines (214) from the gate driver circuit (210) to the sensing pixels (202), charge amplifiers (220) and data lines (218) from the sensing pixels (202) to the charge amplifiers. Each of these components is subsequently described.

In one or more embodiments, the fingerprint sensor (200) includes a substrate (e.g. glass) (240), a sensor layer disposed on the substrate, and a cover layer protecting the sensor layer. The sensor layer, in accordance with one or more embodiments, includes the sensing pixels (202). The fingerprint sensor may be integrated in a device, e.g., in a smartphone, laptop, etc.

Each of the sensing pixels (202) may include a photodiode. The photodiode may convert incident light to charge, which may be read out by an electrically interfacing charge amplifier (220). Each sensing pixel (202) may further include a transistor, e.g., a thin-film transistor (TFT), controlling the operation of the sensing pixel as described with reference to FIG. 3A. The sensing pixels (202) may be arranged in a grid-like structure. Although a rectangular grid is shown in FIG. 2, the sensing pixels (202) may be arranged differently and may include any number of sensing pixels, without departing from the disclosure.

The gate driver circuit (210), in accordance with one or more embodiments, controls the operation of the sensing pixels (202). The control of the sensing pixels may be performed as discussed in detail with reference to FIGS. 5A, 5B, and FIG. 6. The gate driver circuit (210) may be a component of the TFT fingerprint sensor (200). More specifically, the gate driver circuit (210) may be disposed on the substrate (240) in a region adjacent to the sensing pixels. A control input (212) to the gate driver circuit (210) may govern the operation of the gate driver circuit (210). The gate driver circuit (210) electrically interfaces with the sensing pixels (202) via control lines (214).

Data lines (218) may further interface the sensing pixels (202) with charge amplifiers (220), which may convert charge received from the sensing pixels (202) to signals that are suitable for further processing. In one or more embodiments, additional circuitry converts the output of the charge amplifiers (220) into a readout (250). The readout (250) may be provided to other circuits of an electronic device and may be encoded, e.g., as a bus signal.

In one or more embodiments, the sensing pixels (202) are arranged in pixel rows (204) and pixel columns (206), thereby forming a substantially rectangular grid. Each pixel column (206) may be equipped with one control line (214). Accordingly, the gate driver circuit (210) may synchronously control the operation of all sensing pixels in a pixel column (206). Further, each pixel row (204) may be equipped with one data line (218). The sensing pixels (202) in a pixel row (204) may be read out sequentially, using the data line (218). The control lines (214) and data lines (218) may be implemented as traces on the substrate (240).

While FIG. 2 illustrates a specific configuration of a TFT fingerprint sensor, other configurations may be used without departing from the disclosure. For example, the geometric arrangement may deviate from the illustrated arrangement based on pixel rows and pixel columns, the number of sensing pixels may differ, the size and/or density of the sensing pixels may differ, etc.

Figure 3A:
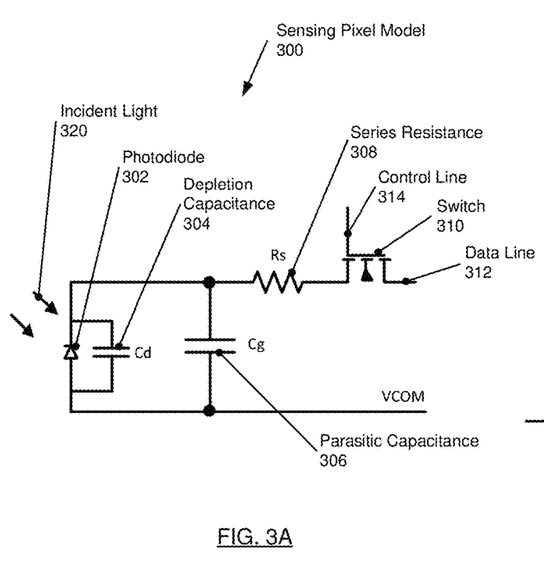
FIG. 3A shows a sensing pixel model of a fingerprint sensor, in accordance with one or more embodiments.

Turning to FIG. 3A, a sensing pixel model of a fingerprint sensor, in accordance with one or more embodiments, is shown. The sensing pixel model (300) may be representative for the sensing pixels of the fingerprint sensor (110).

The sensing pixel model (300), in accordance with one or more embodiments, includes a photodiode (302), a depletion capacitance (304), a parasitic capacitance (306), a series resistance (308), a switch (310), a data line (312) and a control line (314). The photodiode (302) may be exposed to incident light (320). Each of these components is subsequently described. Further, electrical characteristics that are associated with these components are discussed below, with reference to FIG. 3B.

The photodiode (302), may be a photodiode disposed on the substrate (240, in FIG. 2). The photodiode is a semiconductor with an N region and a P region. The photodiode may operate in a forward-biased mode and in a reverse-biased mode. In the forward-biased mode, the photodiode may have photovoltaic characteristics, whereas in the reverse-biased mode, the photodiode may have photoconductive characteristics. Photovoltaic and photoconductive characteristics are described below, with reference to FIG. 3B. In one or more embodiments, and as discussed below, during the readout of a fingerprint, it is desirable to have the photodiode operate in the reverse-biased mode. The photodiode may be actively driven to operate in the reverse-biased mode. However, when the photodiode is not actively driven and while exposed to incident light (320) (e.g., ambient light), the photodiode may show photovoltaic behavior and may, thus, spontaneously enter the forward-biased mode.

Figure 3B:
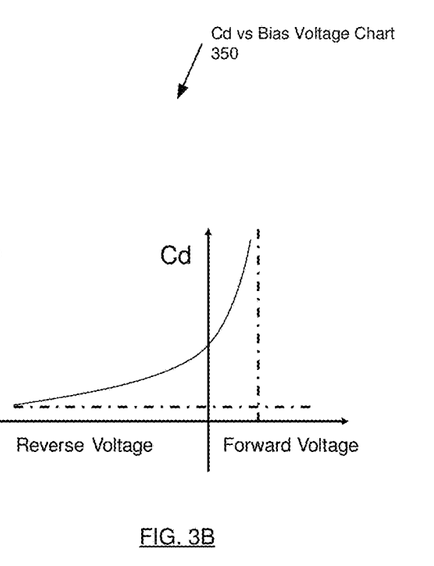
FIG. 3B shows electrical characteristics of a fingerprint sensor, in accordance with one or more embodiments.

The depletion capacitance (304), in accordance with one or more embodiments, is a result of an inter-diffusion of electrons and holes between the N and P regions across the junction between the N and P region of the photodiode (302), resulting in a depletion region with no free carriers. The built-in voltage across the depletion region results in an electric field with the depletion capacitance (304) of the depletion region. An applied reverse bias adds to the built-in voltage and results in a wider depletion region, thus reducing the depletion capacitance (304). In other words, the size of the depletion capacitance (304) may be influenced by the degree of biasing. This behavior is illustrated in FIG. 3B.

The parasitic capacitance (306), in accordance with one or more embodiments, is an additional capacitance of the sensing pixel against surrounding metal layers. The parasitic capacitance (306) may, thus, depend on the design and/or the integration of the fingerprint sensor. The parasitic capacitance (306) may act in parallel to the depletion capacitance (304).

The series resistance (308), in accordance with one or more embodiments, arises from one or more resistances of the sensing pixel. The series resistance (308) may include, for example, contact resistances (not shown), the resistance of the switch (310), etc.

The switch (310), in accordance with one or more embodiments, is a transistor, e.g., a TFT. The switch (310) may be in an open or closed state. The open/closed states are controlled by the control line (314). In the closed state, the switch (310) may electrically interface the photodiode (302) and associated capacitances (304, 306) via the series resistance (308) with an external voltage provided by a charge amplifier (220, in FIG. 2), via the data line (312). Opening and closing the switch (310) may, thus, have the subsequently discussed effects.

When the switch (310) is open, the sensing pixel model (300) is not actively driven or biased. Accordingly, when incident light (320) is present, the resulting photocurrent may drive the sensing pixel model (300) into a photovoltaic state. In the photovoltaic state, a forward voltage builds up as the capacitances (304, 306) are charging. As a result of the increasing forward voltage, the depletion capacitance (304) increases, as illustrated in FIG. 3B. The increase in capacitance is a result of reduced reverse bias (i.e., an increased forward bias), causing a narrowing of the depletion region. As the switch (310) is open for a prolonged time, the sensing pixel model (300) may reach a steady state, at which the forward voltage is constant.

When the switch (310) is closed, the sensing pixel model (300) is exposed to an external voltage. The external voltage may be, for example, +1.5V (and Vcom may be, for example, −5V). Accordingly, the sensing pixel model (300), when the switch (310) is close, is driven toward a reverse-biased state, in accordance with one or more embodiments. However, the transition from the forward-biased state to the reverse-biased state is not instantaneous because the charge stored in the capacitances (304, 306) needs to be cleared via series resistance (308) before the photodiode (302) is pushed from the photovoltaic state to the photoconductive state. Resetting a sensing pixel, i.e., driving the photodiode from the photovoltaic state to the photoconductive state may take up to 1 ms or more.

While a photodiode signal, representative of the incident light (320), may be obtained in both the photovoltaic and the photoconductive state, it may be desirable to operate the sensing pixels of the fingerprint sensor in the photoconductive mode, i.e., in a reversed-bias configuration during fingerprint acquisition. Photodiodes, when operating in photoconductive mode typically have a considerably faster response time and better linearity than when operating in photovoltaic mode. The faster response time is at least partially a result of the decreased depletion capacitance associated with the photodiode operating in the reversed-bias configuration, as illustrated in FIG. 3B.

Accordingly, it may be desirable to operate the photodiodes of the sensing pixels in a reversed-bias configuration, in particular in scenarios that require a rapid readout of the sensing pixels, such as in fingerprint sensors of significant size, in which the readout of many sensing pixels may need to be completed within limited time. Operation of the photodiodes of the sensing pixels in the reverse-bias configuration may be achieved by driving the photodiodes with a voltage of, for example, +1.5V (at, for example, Vcom=−5V).

Figure 4A:
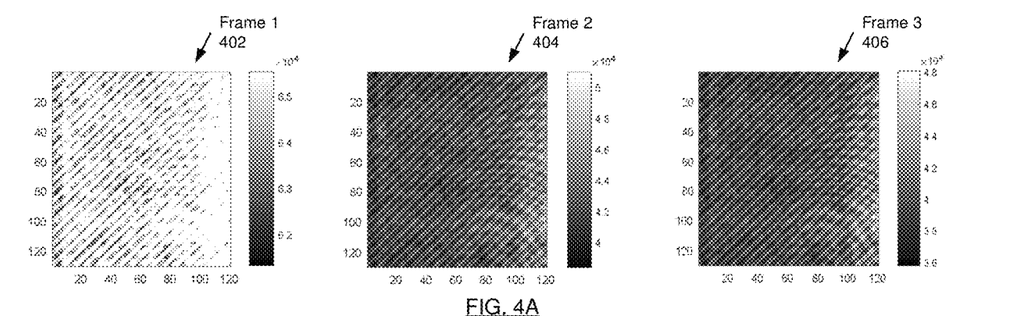
FIG. 4A shows examples of frames captured by a fingerprint sensor.

Turning to FIG. 4A, sample frames captured by a fingerprint sensor are shown. These sample frames are the first frames obtained from the fingerprint sensor after a period of inactivity. Accordingly, the sensing pixels of the fingerprint sensor, at least initially, are operating in photovoltaic mode. However, as previously noted, the design of the fingerprint sensor may require the sensing pixels to operate in photoconductive mode, because photodiodes have a considerably better response time when operating in photoconductive rather than photovoltaic mode. The improved response time may be essential if entire frames of sensing pixels are to be read out within limited time. Assume that in the example shown in FIG. 4A, the frames are read out in <200 ms. Further, assuming a column-by-column readout, only a fraction of 200 ms is, thus, available for the readout of each sensing pixel. This may require the photodiodes of the sensing pixels to be in photoconductive mode during the fingerprint acquisition. In the example of FIG. 4A, a significant forward voltage is initially present in the sensing pixels due to the sensing pixels operating in photovoltaic mode. Frame 1 (402) is a first frame captured after waking up the fingerprint sensor. The majority of the pixels is saturated as a result of the photodiodes carrying a charge from operating in photovoltaic mode, and accordingly it may be difficult to extract fingerprint information from frame 1 (402). Frame 2 (404) is a second frame captured after waking up the fingerprint sensor. The saturation of the pixels has decreased significantly in comparison to frame 1 (402) as the charge is being drained due to the readout operation, thus moving the photodiodes of the sensing pixels toward photoconductive operation. Accordingly, frame 2 (404) may be suitable for the extraction of fingerprint information. Frame 3 (406) is a third frame captured after waking up the fingerprint sensor. The saturation of the pixels has further decreased, in comparison to frame 2 (404). Accordingly, frame 3 (406) may also be suitable for the extraction of fingerprint information.

Figure 4B:
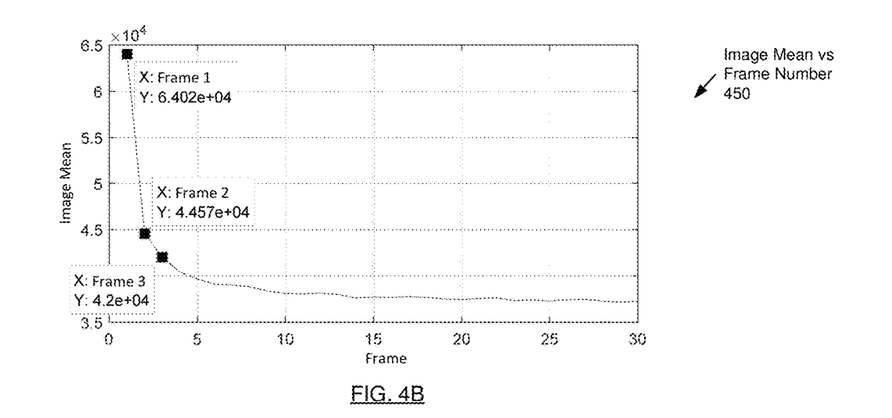
FIG. 4B shows examples of image means for frames captured by a fingerprint sensor.

FIG. 4B shows image means for frames captured by a fingerprint sensor and summarizes the saturation characteristics shown in FIG. 4A. Specifically, the average saturation across frames, indicated by the average image mean (including frames 1, 2 and 3 (402, 404, 406)) is shown. As illustrated, image means initially drop from frame to frame as the sensing pixels transition from being forward-biased to being reverse-biased. While in frame 1, the average saturation is near 100% (a 100% saturation is reached at an image mean of 65,535), the saturation drops as subsequent frames are captured.

As illustrated in FIGS. 4A and 4B, in order to use the photodiodes of the sensing pixels for fingerprint sensing, it may be necessary to drive the photodiodes from having a forward bias (photovoltaic operation) to having a reverse bias (photoconductive operation) by clearing the charge resulting from the photovoltaic effects.

In one embodiment, a reset frame may be used to push the sensing pixels from photovoltaic operation toward photoconductive operation, thereby clearing the excess charge of the sensing pixels. This may enable the subsequent readout of a non-saturated frame shortly after the wakeup of the fingerprint sensor.

Figure 5A:
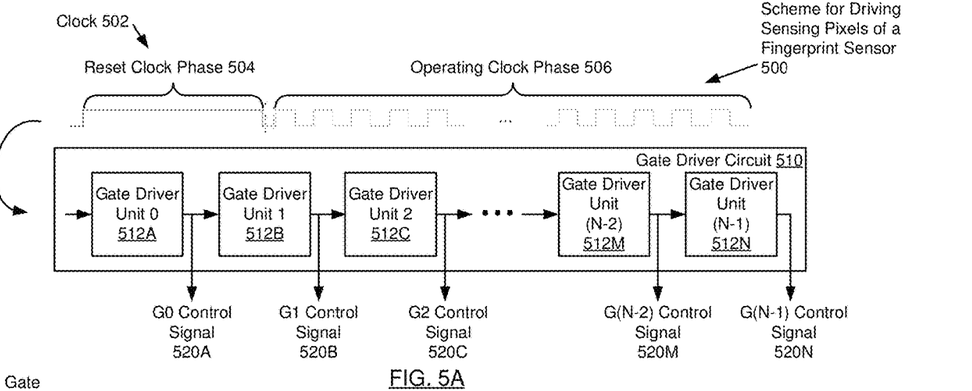
FIGS. 5A and 5B show a scheme for driving sensing pixels of a fingerprint sensor, in accordance with one or more embodiments.
Figure 5B:
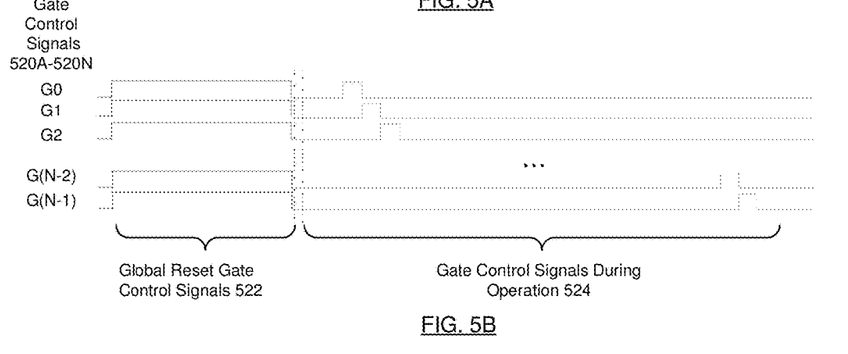

FIGS. 5A and 5B illustrate an example scheme for driving sensing pixels of a fingerprint sensor. A clock signal (502) is applied to a gate driver circuit (510), shown in FIG. 5A, to produce gate control signals (520A-520N), shown in FIG. 5B, that control acquisition of fingerprint frames.

The gate driver circuit (510) of FIG. 5A may be similar or same to the gate driver circuit (210) described previously in FIG. 2. The gate driver circuit (510) may be configured to control the operation of N pixel columns, e.g., pixel columns 0 . . . N−1. Accordingly, the gate driver circuit (510) may output N gate control signals (520A-520N). Each of these gate control signals may control the sensing pixels in a pixel column. More specifically, a gate control signal may control the operation of the switches (310) of sensing pixel model (300), previously described in FIG. 3. The combination of all gate control signals (520A-520N) for all rows of sensing pixels may thus control all sensing pixels of a TFT fingerprint sensor.

In one or more embodiments, the gate driver circuit (510) operates analogous to a shift register in that the clock signal (502) is shared by a series of logic circuits arranged in a cascade. Each logic circuit forms a gate driver unit (512A-512N). In this cascade configuration, each gate driver unit except the first gate driver unit in the cascade receives its input from the output of the preceding gate driver unit. The first gate driver unit may receive an external input, e.g., a single half-cycle or cycle of the clock signal (502). The configuration of these gate driver units is further discussed below with reference to FIG. 6.

In one or more embodiments, when the input to the first gate driver unit (gate driver unit 0 (512A)) is high while the clock signal (502) reaches or is in a "high" state (first half-cycle of the clock signal), the output of gate driver unit 0 (512A) becomes high and remains high while the clock signal (502) is in the high state. Once the clock signal (502) switches to a "low" state (second half-cycle of the clock signal), the output of gate driver unit 0 (512A) also becomes low. Accordingly, gate driver unit 0 (512A) outputs a gate control signal (520A) for the duration of the high state of the clock signal. As the clock signal switches to the low state, gate driver unit 1 (512B) outputs a gate control signal (520B) for the duration of the low state of the clock signal. Subsequently, as the clock signal switches to the high state again, gate driver unit 2 (512C) outputs a gate control signal (520C) for the duration of the high state of the clock signal, etc., until all gate driver units (520A-520N) have provided their gate control signals (520A-520N), each for the duration of a single clock half-cycle. The gate control signals (520A-520N) obtained from the outputs of gate driver units 0 . . . N−1 (512A-512N) are illustrated in FIG. 5B. These gate control signals during operation (524) may be used to control the readout of the sensing pixels arranged in N pixel columns. The clock cycle time may be governed by the time available for acquiring a complete fingerprint frame. Assume, for example, a fingerprint sensor that includes 140 pixel columns, and further assume that a complete fingerprint frame is to be obtained in 20 ms. Accordingly, each pixel column is to be read out in 20 ms/140=approx. 140 μs. In the example, low and high phases of a single clock cycle would thus be 140 μs, resulting in a clock cycle time of approx. 280 μs. Other timing requirements may exist without departing from the disclosure.

Due to the previously discussed time required for resetting sensing pixels (i.e., for driving photodiodes from photovoltaic to photoconductive state), resetting the sensing pixels during the readout of the operating clock phase (506) may not be feasible. In one or more embodiments, a global reset is performed, prior to the readout of the sensing pixels.

The global reset gate control signal (522), may be provided simultaneously by all gate driver units (512A-512N), thus triggering a reset of the sensing pixels prior to the readout of the sensing pixels. The duration of the global reset may be chosen to be sufficiently long to allow driving of the photodiodes of the sensing pixels from photovoltaic to photoconductive state. The duration may be, for example, at least 1 ms, e.g., 10 ms. To achieve a global reset, the clock signal (502) may be set to high for the desired duration of the reset, e.g., for 10 ms. During this reset clock phase (504), all gate driver units (512A-512N) of the gate driver circuit (510) may simultaneously produce high gate control signals (520A-520N), thus closing the switches (310) of the sensing pixel model (300) to enable the transition from photovoltaic to photoconductive state. The circuitry of the gate driver units (512A-512N) enabling the global reset gate control signals is discussed below with reference to FIG. 6.

Figure 6:
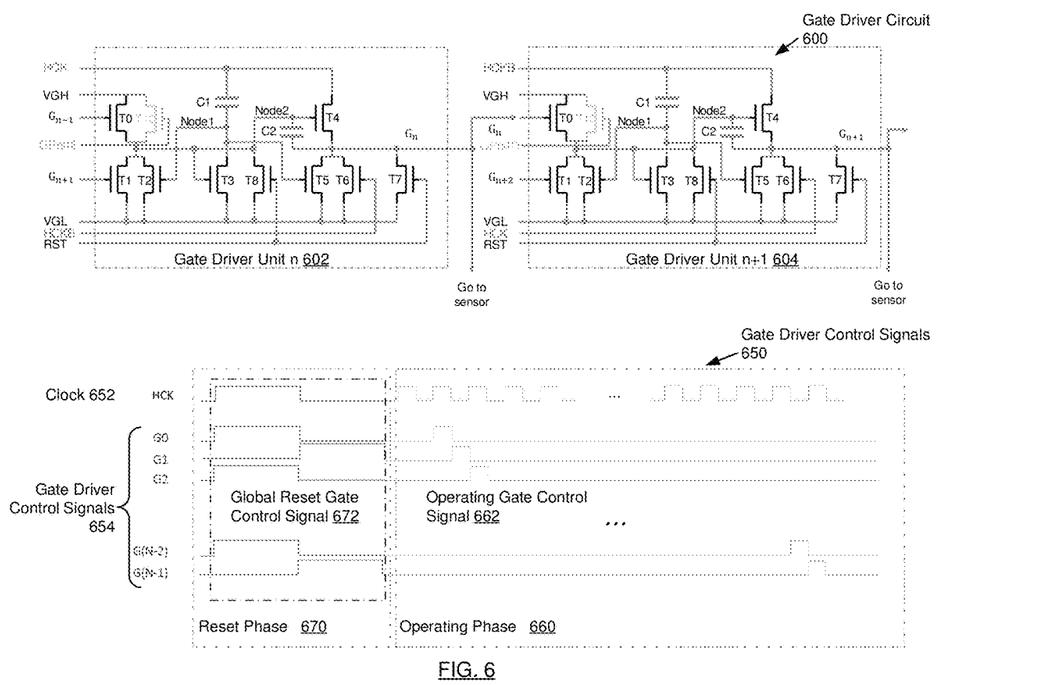
FIG. 6 shows a gate driver circuit of a fingerprint sensor and gate driver control signals in accordance with one or more embodiments.

Turning to FIG. 6, a gate driver circuit (600) and gate driver control signals (650) for a fingerprint sensor in accordance with one or more embodiments, are shown.

As previously noted, the gate driver units of the gate driver circuit are cascaded, i.e., the output of a preceding gate driver unit serves as an input of the succeeding gate driver unit. In one or more embodiments, two types of gate driver units are alternatingly arranged in a cascade. In a zero-based numbering scheme, even-numbered gate driver units (first type of gate driver circuit (602)) are configured to output a gate control signal when the clock signal is in a "high" state, whereas odd-numbered gate driver units (second type of gate driver circuit (604)) are configured to output a gate control signal when the clock signal is in a "low" state, in accordance with one or more embodiments. Accordingly, with a clock cycle consisting of "low" and "high" half-cycles, two adjacently located gate driver units in the cascade may consecutively output a gate control signal to the sensing pixels that are connected to these gate driver units by control lines, as shown in FIG. 2. As the input, initially provided to the first gate driver circuit in the cascade, propagates through the cascade, the gate driver circuits may consecutively output an operating gate control signal (662) during an operating phase (660) used for the readout of the sensing pixels. The output by the gate driver units (602, 604) during the operating phase (660) is illustrated in the lower panel of FIG. 6. The gate driver control signals (654) of even-numbered gate driver circuits (602) may be synchronized with "high" states of the clock signal (652), whereas the gate control signals of odd-numbered gate driver circuits (604) may be synchronized with "low" states of the clock signal (652). Thus, during the operating phase (660), the gate driver control signals (654) are operating gate control signals (662). As subsequently described, the gate driver control signals (654) may have different characteristics during a reset phase (670).

In one or more embodiments, the operating phase (660) is preceded by the reset phase (670). As previously discussed, it may be desirable to expose the photodiodes of the fingerprint sensor to a reverse biasing voltage to drive the photodiodes from photovoltaic operation to photoconductive operation. In one or more embodiments, the reset phase (670) is performed prior to the operating phase (660) to drive the photodiodes to photoconductive operation using a global reset gate control signal (672) that is applied to all sensing pixels of the fingerprint sensor.

In one or more embodiments, the global reset gate control signal (672) includes two phases. During the first phase, the even-numbered gate driver units (602) simultaneously provide an output to the subset of sensing pixels that are electrically connected to these even-numbered gate driver units. During the second phase, following the first phase, the odd-numbered gate driver units (604) simultaneously provide an output to the subset of sensing pixels that are electrically connected to these odd-numbered gate driver units. The output by the even-numbered gate driver units (602) coincides with a "high" state of the clock signal (652), and the output by the odd-numbered gate driver units (604) coincides with a "low" state of the clock signal (652), as illustrated in the lower panel of FIG. 6. The duration of each of the "low" and the "high" states may be selected such that the reverse biasing voltages applied to the photodiodes of the sensing pixels is sufficient to drive the photodiodes from photovoltaic to photoconductive operation. Referring back to FIG. 2, during the "high" state of the clock signal (652), all sensing pixels in all even-numbered pixel columns may be driven to photoconductive operation, and during the "low" state of the clock signal, all sensing pixels in all odd-numbered pixel columns may be driven to photoconductive operation.

The above-described alternating reset of even-numbered and odd-numbered sensing columns may be accomplished as follows. In one or more embodiments, all even-numbered gate driver units (602) are equipped with a global pixel reset request input (GPrstE), and all odd-numbered gate driver units (604) are equipped with a global pixel reset request input (GPrstO), as shown in the upper panel of FIG. 6. Once a global pixel reset request input (GPrstE/GPrstO) is received by a gate driver unit, the gate driver unit may output the global reset gate control signal for the duration of the clock signal being "high". The output of the global reset gate control signal may occur simultaneously for all even-numbered gate driver units (602), and simultaneously for all odd-numbered gate driver units (604). Multiple global cycles may be performed, if desired.

Each of the even-numbered gate driver units (602) and each of the odd-numbered gate driver units (604) include one transistor (T10), to accept the global pixel reset request input (GPrstE/GPrstO). T10 causes the output of the global reset gate control signal when a global pixel reset request (GPrstE/GPrstO) is received.

Gate driver unit (602, 604) operation may be described as follows: Transistor 4 (T4) connects to HCK (clock) or HCKB (inverted clock), respectively, for the even/odd numbered gated driver units (602, 604). Initially, an RST pulse is issued to T7 to reset the outputs ($G_n$, $G_{n+1}$, ... ) to low, and further to discharge C2 through T8. The RST pulse is necessary for the (GPrstE/GPrstO) signals to have an effect. Then, for gate driver unit $G_n$, when the $G_{n-1}$ pulse arrives while HCK is low, C2 is charged through T0, with C2 being connected to VGL (low) through T6, and with HCKB being high. At the time when HCK goes high and HCKB goes low, T6 turns off. The voltage on C2 turns on T4, and output $G_n$ goes high for a half-cycle until HCK goes low. The voltage on C2 eventually reaches zero, and therefore T4 can no longer turn on again, thus keeping $G_n$ low. Similarly, the $G_n$ pulse turns on T0 of gate driver unit n+1 to charge C2 of that gate drive unit. When HCK goes low and HCKB goes high, $G_{n+1}$ also goes high, which discharges C2 so that when HCK goes goes high again, the voltage on C2 is around zero and does no longer turn on T4. Accordingly, $G_n$ is prevented from going high again.

In addition, when the voltage of node 2 is low, T3 is turned off. The voltage of node 1 follows HCK, so that either HCK is high or HCKB is high, and one of T5 and T6 are turned on, thereby ensuring that $G_n$ is not floating. When the voltage of node 2 is high, then T3 is turned on, and node 1 is low. T5 is turned off while T4 is on.

While the above description is for gate driver unit Gn, other gate driver units may operate in a similar manner. Further, even and odd numbered gate driver units operate alternatingly but are otherwise similar. For even-numbered gate driver units, T10 is connected to GPrstE, and for odd-numbered gate drive units, T10 is connected to GPrstO. GPrstE signals come on while HCK is low, and all even-numbered gate driver units turn on when HCK is high. GPrstO causes a similar behavior for the odd-numbered gate driver units.

Those skilled in the art will appreciate that while a particular implementation of the gate driver circuit (600) is shown and discussed, alternative implementations that may be functionally equivalent or similar are within the scope of the disclosure and may produce gate driver control signals (650) similar or identical to those shown in FIG. 6. Various components may be combined into a single component, a single component may be separated into multiple components, some components may not exist in an implementation, and other variations may occur. More specifically, for example, the gate driver units (602, 604) are based on a specific arrangement of transistors. Differently implemented gate driver units that are capable of performing in an operating phase to allow a readout of sensing pixels and performing in a reset phase to expose the sensing pixels to a reverse-biasing voltage may be used without departing from the disclosure. Further, the gate driver circuit may be scaled to drive any number of sensing pixels, i.e., the gate driver circuit may include any number of gate driver units. Also, while a gate driver circuit that operates on half-cycles of the clock signal is described, a gate driver circuit may alternatively operate on full clock cycles. In addition, the timing of the clock signal during the operating phase and/or during the reset phase may be adjusted based on, for example, the characteristics of the photodiodes used for the sensing pixels, timing requirements, etc.

Figure 7:
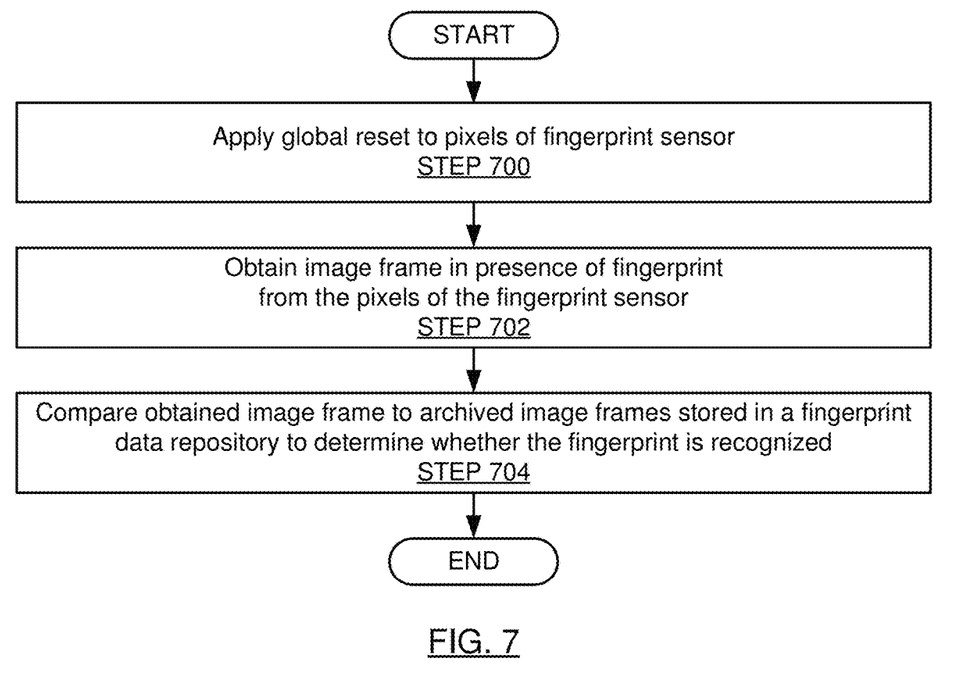
FIG. 7 shows a flowchart depicting a method for operating an electronic device, in accordance with one or more embodiments.

FIG. 7 shows a flowchart in accordance with one or more embodiments. The flowchart of FIG. 7 depicts a method for operating an electronic device. One or more of the steps in FIG. 7 may be performed by the components discussed above in reference to FIGS. 1, 2, 3A, 3B, 4A, 4B, 5A, 5B, and 6. In one or more embodiments, one or more of the steps shown in FIG. 7 may be omitted, repeated, and/or performed in a different order than the order shown in FIG. 7. Additional steps may further be performed. Accordingly, the scope of the disclosure should not be considered limited to the specific arrangement of steps shown in FIG. 7.

Initially, in STEP 700, a global reset signal is applied to the pixels of the fingerprint sensor. The global reset signal drives the pixels from a photovoltaic operation toward a photoconductive operation. The global reset signals are applied as discussed with reference to FIGS. 5A, 5B and FIG. 6.

In STEP 702, an image frame is obtained using the pixels of the fingerprint sensor. The image frame is obtained while a finger is placed on the fingerprint sensor. Accordingly, the image frame may contain a fingerprint image. Because the global reset signal drove the pixels toward photoconductive operation, the pixels are at a saturation level that enables the retrieval of fingerprint data, in accordance with one or more embodiments of the disclosure.

In STEP 704, the obtained image frame is compared to archived image frames stored in the fingerprint data repository to determine whether the fingerprint in the image frame obtained from the fingerprint sensor matches a fingerprint in the fingerprint data repository and is, thus, recognized.

Steps 702 and 704 may be repeatedly executed.

One or more embodiments may have various advantages. By applying a reset to the pixels of the fingerprint sensor, the pixels may be driven from a photovoltaic to a photoconductive mode, thus reducing the saturation of the pixels in the initially obtained frames. As a result, the first and/or other early frames may be usable for the detection of fingerprints. Only minimal modifications to the gate driver circuit may be necessary for the implementation of the reset. Specifically, only a single transistor may need to be added to the even-numbered gate driver units. Thus, embodiments may be implemented without requiring significant circuit redesign and/or without requiring significant additional space for the added circuit components, thereby limiting cost and effort for providing superior fingerprint sensing results.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. An input device comprising:
   a plurality of sensing pixels, each sensing pixel comprising a photodiode; and
   a gate driver circuit configured to:
   control operation of the plurality of sensing pixels, the gate driver circuit comprising a set of cascaded gate driver units, wherein each of the cascaded gate driver units is associated with a subset of the plurality of sensing pixels and configured to control an operation of the subset of the plurality of sensing pixels;
   output, by the set of cascaded gate driver units, during a reset phase of the input device, a global reset gate control signal to the plurality of sensing pixels in response to a clock signal; and
   output, sequentially by each of the cascaded gate driver units, during an operating phase of the input device, an operating gate control signal to the associated subset of the plurality of sensing pixels.

2. The input device of claim 1, wherein the cascaded gate driver units operate as a shift register.

3. The input device of claim 2, wherein the cascaded gate driver units comprise, alternatingly:
   a first type of gate driver unit that outputs the global reset gate control signal when the clock signal is in a high state; and
   a second type of gate driver unit that outputs the global reset gate control signal when the clock signal is in a low state,
   thereby causing the shift register to operate on clock half-cycles.

4. The input device of claim 3,
   wherein each of the first type of gate driver units receives a first global pixel reset request, provided during the reset phase, and
   wherein the first global pixel reset request in combination with the clock signal in the high state causes all of the first type of gate driver units to simultaneously output the global reset gate control signal.

5. The input device of claim 4,
   wherein each of the second type of gate driver units receives a second global pixel reset request, provided during the reset phase, and
   wherein the second global pixel reset request in combination with the clock signal in the low state causes all of the second type of gate driver units to simultaneously output the global reset gate control signal.

6. The input device of claim 1, wherein the cascaded gate driver units sequentially output the operating gate control signal, with only one of the cascaded gate driver units outputting the operating gate control signal at a time.

7. The input device of claim 1 wherein, in each of the sensing pixels, the global reset gate control signal causes an application of a reverse biasing voltage to the photodiode of the sensing pixel.

8. The input device of claim 7, wherein a duration of the global reset gate control signal is sufficiently long for the reverse biasing voltage to drive the photodiode from a photovoltaic operating mode to a photoconductive operating mode.

9. The input device of claim 7, wherein the reverse biasing voltage is applied by connecting the sensing pixel to a charge amplifier.

10. The input device of claim 1, wherein when the global reset gate control signals are emitted during the reset phase, the sensing pixels receiving the global reset gate control signals are in photovoltaic mode.

11. The input device of claim 1, wherein when the operating gate control signals are emitted during the operating phase, the sensing pixels receiving the operating gate control signals are in photoconductive mode.

12. A method for operating an input device, the method comprising:
  during a reset phase of the input device:
    providing a first clock signal to a gate driver circuit of the input device;
    outputting, by a plurality of cascaded gate driver units of the gate driver circuit, in response to the first clock signal, a global reset gate control signal to a plurality of sensing pixels of the input device, to reset the plurality of sensing pixels,
    wherein each of the plurality of sensing pixels comprises a photodiode, and
    wherein each of the cascaded gate driver units is associated with a subset of the plurality of sensing pixels, controlling the operation of the subset of the sensing pixels; and
  during an operating phase of the input device, following the reset phase:
    providing a second clock signal to the gate driver circuit of the input device;
    outputting, sequentially by each of the plurality of cascaded gate driver units, in response to the second clock signal, an operating gate control signal to the associated subsets of the plurality of sensing pixels to obtain an image frame comprising a fingerprint image using the plurality of pixels; and
  comparing the obtained image frame to archived image frames stored in a fingerprint data repository to determine whether the fingerprint image is recognized.

13. The method of claim 12, wherein the cascaded gate driver units operate as a shift register.

14. The method of claim 12, wherein the cascaded gate driver units comprise, alternatingly:
  a first type of gate driver unit that outputs the global reset gate control signal when the clock signal is in a high state; and
  a second type of gate driver unit that outputs the global reset gate control signal when the clock signal is in a low state,
  thereby causing the shift register to operate on clock half-cycles.

15. The method of claim 14, further comprising:
  receiving by each of the first type of gate drive units a first global pixel reset request, during the reset phase,
  wherein the first global pixel reset request in combination with the clock signal in the high state causes all of the first type of gate driver units to simultaneously output the global reset gate control signal.

16. The method of claim 14, further comprising:
  receiving by each of the second type of gate drive units a second global pixel reset request, during the reset phase,
  wherein the second global pixel reset request in combination with the clock signal in the low state causes all of the second type of gate driver units to simultaneously output the global reset gate control signal.

17. The method of claim 12, wherein the cascaded gate driver units sequentially output the operating gate control signal, with only one of the cascaded gate driver units outputting the operating gate control signal at a time.

18. The method of claim 12, wherein, in each of the sensing pixels, the global reset gate control signal causes an application of a reverse biasing voltage to the photodiode of the sensing pixel.

19. The method of claim 18, wherein a duration of the global reset gate control signal is sufficiently long for the reverse biasing voltage to drive the photodiode from a photovoltaic operating mode to a photoconductive operating mode.

20. The method of claim 18, wherein the reverse biasing voltage is applied by connecting the sensing pixel to a charge amplifier.

* * * * *